United States Patent
Dewas et al.

(10) Patent No.: US 8,924,047 B2
(45) Date of Patent: Dec. 30, 2014

(54) METHOD OF CORRECTING A LATERAL TRAJECTORY ON APPROACH AS A FUNCTION OF THE ENERGY TO BE REABSORBED

(71) Applicant: Thales, Neuilly-sur-Seine (FR)

(72) Inventors: Emmanuel Dewas, Toulouse (FR); Vincent Savarit, Toulouse (FR); Francois Coulmeau, Seilh (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 13/789,595

(22) Filed: Mar. 7, 2013

(65) Prior Publication Data
US 2013/0238174 A1  Sep. 12, 2013

(30) Foreign Application Priority Data
Mar. 8, 2012  (FR) ...................... 12 00702

(51) Int. Cl.
G05D 1/06 (2006.01)
G05D 1/10 (2006.01)

(52) U.S. Cl.
CPC ............. *G05D 1/0676* (2013.01); *G05D 1/101* (2013.01)
USPC ........ 701/16; 701/4; 701/9; 701/14; 701/465; 340/945; 340/963

(58) Field of Classification Search
CPC .................................. G05D 1/10; G05D 1/202
USPC ............... 701/4, 9, 14, 16, 465; 340/945, 963
See application file for complete search history.

(56) References Cited

U.S. PATENT DOCUMENTS

| | | | |
|---|---|---|---|
| 7,132,960 B2* | 11/2006 | Glover | 340/945 |
| 7,962,254 B2* | 6/2011 | Bouchet et al. | 701/4 |
| 8,311,687 B2* | 11/2012 | Bakker | 701/3 |
| 8,451,144 B2* | 5/2013 | Ishihara et al. | 340/969 |
| 2004/0075586 A1* | 4/2004 | Glover | 340/963 |
| 2006/0200279 A1* | 9/2006 | Ainsworth et al. | 701/16 |
| 2007/0164167 A1* | 7/2007 | Bachelder et al. | 244/220 |
| 2010/0004801 A1* | 1/2010 | Flotte et al. | 701/8 |
| 2011/0077858 A1* | 3/2011 | Coulmeau et al. | 701/204 |
| 2011/0166723 A1* | 7/2011 | Valentova et al. | 701/16 |
| 2011/0251740 A1* | 10/2011 | Gomez Ledesma et al. | 701/8 |

(Continued)

FOREIGN PATENT DOCUMENTS

| | | |
|---|---|---|
| EP | 2148260 A1 | 1/2010 |
| EP | 2282173 A1 | 2/2011 |

*Primary Examiner* — Thomas G Black
*Assistant Examiner* — Wae Louie
(74) *Attorney, Agent, or Firm* — Baker & Hostetler LLP (57) ABSTRACT

In the field of the calculation of the approach trajectory of an aircraft, and relating to a method for determining a corrected lateral approach trajectory as a function of the energy to be reabsorbed before the landing, and also to a flight management system making it possible to determine the corrected lateral trajectory, a method comprises: determining an energy of the aircraft $E_{aero}$ upon crossing the runway threshold on the basis of a predetermined approach trajectory and of a current state of the aircraft, said state comprising at least one current altitude, a current ground speed and a mass of the aircraft; comparing the energy $E_{aero}$ with a predetermined maximum energy $E_{max}$, and when the energy $E_{aero}$ is greater than the energy $E_{max}$, determining the corrected lateral approach trajectory as a function of the difference between the energy of the aircraft $E_{aero}$ and the maximum energy $E_{max}$.

12 Claims, 5 Drawing Sheets

(56) References Cited

U.S. PATENT DOCUMENTS

| | | | |
|---|---|---|---|
| 2012/0029735 A1* | 2/2012 | Bakker | 701/3 |
| 2012/0053760 A1* | 3/2012 | Burnside et al. | 701/3 |
| 2013/0238174 A1* | 9/2013 | Dewas et al. | 701/16 |

* cited by examiner

METHOD OF CORRECTING A LATERAL TRAJECTORY ON APPROACH AS A FUNCTION OF THE ENERGY TO BE REABSORBED

CROSS-REFERENCE TO RELATED APPLICATION

This application claims priority to foreign French patent application No. FR 1200702, filed on Mar. 8, 2012, the disclosure of which is incorporated by reference in its entirety.

FIELD OF THE INVENTION

The invention lies in the field of the calculation of the approach trajectory of an aircraft. It relates to a method for determining a corrected lateral approach trajectory as a function of the energy to be reabsorbed. The invention also relates to a flight management system making it possible to determine the corrected lateral trajectory.

BACKGROUND

Today, most civil aircraft are equipped with a flight management system, commonly abbreviated FMS. An FMS consists of various functional components which allow notably the crew of the aircraft to define a flight plan on the basis of departure and arrival points and of a navigation database. A flight plan furthermore comprises a chronological sequence of waypoints described by their three-dimensional position and optionally their scheduled flyby time. On the basis of the flight plan, of the navigation database and of a database of performance of the aircraft, the FMS can determine a three-dimensional trajectory and a speed profile to be followed by the aircraft. The three-dimensional trajectory is formed by a string of segments connecting the waypoints in pairs. The projection of the three-dimensional trajectory into a horizontal plane is called the lateral trajectory and the projection of the three-dimensional trajectory into a vertical plane is called the vertical trajectory or vertical profile. In practice, the lateral and vertical trajectories are often calculated independently of one another. The lateral trajectory is calculated initially as a function of the list of waypoints of the flight plan. The vertical trajectory is thereafter calculated as a function of the lateral trajectory and of the altitude and speed conditions imposed by the flight plan and by the performance of the aircraft.

During a landing runway approach phase, the determination of the three-dimensional trajectory of the aircraft is subject to additional constraints. Indeed, it is necessary to guarantee that the ground speed of the aircraft at the moment of landing, and more precisely on touchdown of the wheels, is less than or equal to a threshold speed. Likewise, the aircraft must reach the threshold of the landing runway at an altitude that is below a threshold altitude, for example of the order of 50 to 100 feet above the altitude of the runway. Stated otherwise, at the moment at which it crosses the threshold of the landing runway, the aircraft must possess a kinetic energy and potential energy that are below predetermined thresholds. These predetermined thresholds are notably aircraft dependent. With a view to obtaining the required ground speed and the required altitude, a theoretical approach trajectory is calculated by the FMS by starting from the landing runway with a required ground speed and a required altitude (typically an altitude equal to the altitude of the runway threshold +50 feet) and by backtracking either up to a cruising level, for example the last cruising level of the aircraft before the approach and descent phase, or up to the current position of the aircraft. Such calculation is termed "backward" calculation. On the basis of the theoretical approach trajectory, a so-called "real" approach trajectory is calculated by taking account of the performance of the aircraft and of its state, namely notably its altitude, its ground speed, its vertical speed and its mass. The calculation of the real approach trajectory is termed "forward" calculation, insofar as it is carried out on the basis of the current position of the aircraft. A problem with the determination of the theoretical approach trajectory is that it is not necessarily compatible with the aircraft's performance. Stated otherwise, at the moment at which the theoretical approach trajectory is determined, the state of the aircraft, notably its altitude, its ground speed and its mass, may be such that it is physically impossible to put it down with the required ground speed and altitude conditions. Numerically, the "forward" calculation does not succeed in linking up with the "backward" calculation, at the runway.

At the present time, FMSs merely note the discrepancy between the required conditions for landing and the predictions of ground speed and altitude at the moment of landing. It is notably possible to represent visually on a screen the differences in altitude and in speed between the current conditions and the conditions required to cross the runway threshold with the altitude required and the ground speed required for landing. However, this visual information does not make it possible to determine whether or not it is possible to correct the ground speed and the altitude during the final approach so as to reach the runway threshold with the required conditions. Patent application EP 2282173 describes a method for displaying a linkup trajectory toward a final approach trajectory in which an item of information relating to the energy of the aircraft is represented on the approach trajectory. The approach trajectory is for example represented in red when the energy of the aircraft is too high. Thus, the current solutions merely provide an item of information according to which the energy of the aircraft is incompatible with the maximum permissible energy for the landing, and do not propose any lateral or vertical trajectory correction.

SUMMARY OF THE INVENTION

An aim of the invention is notably to make it possible to determine an approach trajectory compatible with the required ground speed and the required altitude. For this purpose, the subject of the invention is a method for determining a corrected approach trajectory for the approach of an aircraft to a landing runway. The method comprises:

a step of determining an energy of the aircraft $E_{aero}$ upon crossing the runway threshold on the basis of a predetermined approach trajectory and of a current state of the aircraft, said state comprising at least one current altitude, a current ground speed and a mass of the aircraft, a step of comparing the energy of the aircraft $E_{aero}$ upon crossing the runway threshold with a predetermined maximum energy $E_{max}$, when the energy of the aircraft $E_{aero}$ upon crossing the runway threshold is greater than the maximum energy $E_{max}$, a step of determining a corrected approach trajectory as a function of the difference between the energy of the aircraft $E_{aero}$ and the maximum energy $E_{max}$.

The energy of the aircraft $E_{aero}$ upon crossing the runway threshold comprises for example a kinetic energy and a potential energy, the kinetic energy being determined as a function of a ground speed of the aircraft upon crossing the runway threshold, and the potential energy being determined as a function of an altitude of the aircraft with respect to the runway upon crossing the runway threshold.

According to a particular embodiment, the maximum energy $E_{max}$ is determined as a function of a maximum ground speed and of a maximum altitude of the aircraft with respect to the runway.

According to a particular embodiment, the step of determining the corrected approach trajectory comprises:

a sub-step of determining an energy to be reabsorbed $E_{excess}$ as a function of the energy of the aircraft $E_{aero}$ upon crossing the runway threshold and of the maximum energy $E_{max}$, a sub-step of determining a trajectory length $D_{corr}$ making it possible to reabsorb the energy $E_{excess}$ as a function of performance of the aircraft, a sub-step of determining a corrected lateral trajectory as a function of the trajectory length $D_{corr}$, and a sub-step of determining a corrected vertical trajectory as a function of the corrected lateral trajectory and of the performance of the aircraft.

The step of determining the corrected approach trajectory can then comprise, furthermore:

a sub-step of determining an energy $E'_{aero}$ of the aircraft upon crossing the runway threshold on the basis of the corrected lateral trajectory, of the corrected vertical trajectory, and of the current state of the aircraft, a sub-step of comparing the energy of the aircraft $E'_{aero}$ with the maximum energy $E_{max}$, when the energy of the aircraft $E'_{aero}$ is greater than the maximum energy $E_{max}$, a repetition of the sub-steps of the step of determining the corrected approach trajectory as a function of the difference between the energy of the aircraft $E'_{aero}$ and the maximum energy $E_{max}$.

The form of the corrected lateral trajectory can notably be dependent on the fact that the aircraft is or is not flying according to an approach trajectory imposed by a flight plan, and/or on the fact that the heading of the aircraft does or does not converge toward the axis of the landing runway.

In particular, when the aircraft is not flying on an approach trajectory imposed by a flight plan, when its heading converges toward the axis of the landing runway, and when an angle $\theta_c$ formed between the axis of the landing runway and the heading of the aircraft is less than a reference angle $\theta_{ref}$, the form of the corrected lateral trajectory can be of type 1A or of type 1B, a corrected lateral trajectory of type 1A comprising a part making it possible to link up with the axis of the runway at a distance from the runway threshold that is greater than a distance between the runway threshold and a point of intersection between the heading of the aircraft and the axis of the landing runway, a corrected lateral trajectory of type 1B comprising a first straight segment substantially parallel to the axis of the landing runway and a second straight segment substantially linking up with the axis of the landing runway.

When the aircraft is not flying on an approach trajectory imposed by a flight plan, when its heading converges toward the axis of the landing runway, and when an angle $\theta_c$ formed between the axis of the landing runway and the heading of the aircraft is greater than a reference angle $\theta_{ref}$, the form of the corrected lateral trajectory can be of type 1A.

When the aircraft is not flying on an approach trajectory imposed by a flight plan, and when its heading does not converge toward the axis of the landing runway, the form of the corrected lateral trajectory can be of type 2, such a trajectory comprising a first segment distancing the aircraft from the axis of the landing runway and a second segment thereafter causing the aircraft to link up with the axis of the landing runway. An angle formed between the axis of the landing runway and the first segment of the trajectory of type 2 can be less than an angle formed between the axis of the landing runway and the heading of the aircraft.

When the aircraft is flying on an approach trajectory imposed by a flight plan, and when its heading is not aligned with the axis of the landing runway, the form of the corrected lateral trajectory can be of type 3. Such a trajectory comprises, in place of the last straight segment of the approach trajectory imposed by the flight plan:

a segment making it possible to link up with the axis of the runway at a distance from the runway threshold that is greater than a distance between the runway threshold and a point of intersection between the last straight segment of the approach trajectory imposed by the flight plan and the axis of the landing runway, when said last straight segment converges toward the axis of the runway and when an angle formed between said last straight segment and the axis of the landing runway is less than a reference angle, a first straight segment substantially parallel to the axis of the landing runway and a second straight segment substantially linking up with the axis of the landing runway, when the last straight segment of the approach trajectory imposed by the flight plan converges toward the axis of the runway and when an angle formed between said last straight segment and the axis of the landing runway is greater than a reference angle, or a first segment distancing the aircraft from the axis of the landing runway and a second segment thereafter causing the aircraft to link up with the axis of the landing runway, when the last straight segment of the approach trajectory imposed by the flight plan does not converge toward the axis of the runway.

The subject of the invention is also a flight management system of an aircraft comprising means for implementing the method for determining the corrected approach trajectory.

An advantage of the invention is that the ground speed and altitude constraints are processed by means of one and the same quantity, namely the energy of the aircraft. Alternatively, a mechanical approach, based on the equations of dynamics, can be used instead of the energy approach.

BRIEF DESCRIPTION OF THE DRAWINGS

The invention will be better understood and other advantages will become apparent on reading the description which follows, given in relation to appended drawings in which.

DETAILED DESCRIPTION

Figure 1:
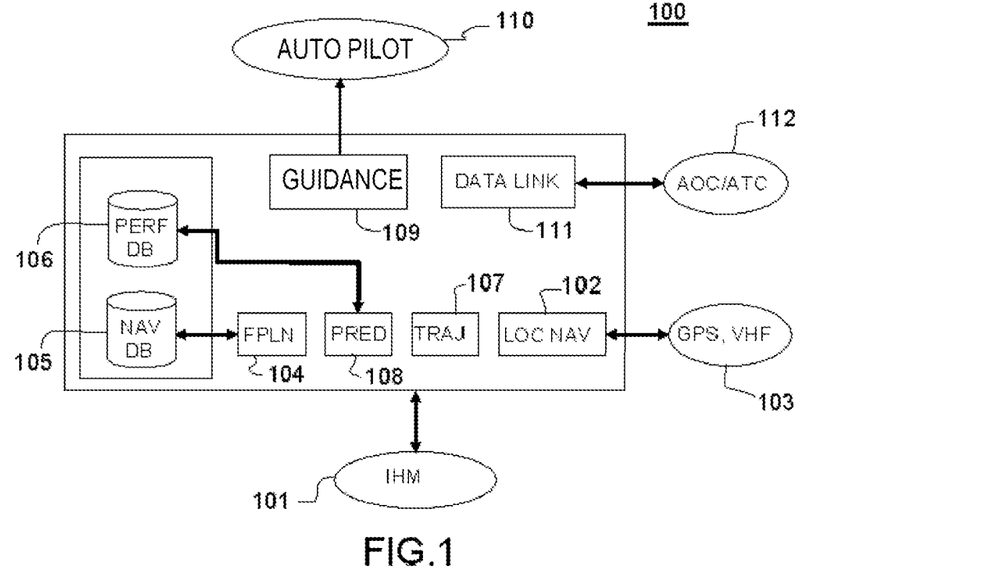
FIG. 1 is a functional representation of a flight management system of an aircraft.

FIG. 1 is a functional representation of a flight management system for an aircraft. A flight management system is commonly abbreviated to FMS. The FMS 100 represented in FIG. 1 comprises a man-machine interface 101 and modules fulfilling the various functions described in the ARINC 702 standard entitled "Advanced Flight Management Computer System". The man-machine interface 101 comprises for example a keyboard and a display screen, or quite simply a tactile display screen. A navigation module 102, named "LOC NAV", makes it possible to perform optimal location of the aircraft as a function of geolocation means 103, for example a satellite (GPS or GALILEO) location system, VHF radionavigation beacons, or inertial platforms. A module 104 for determining flight plans, named "FPLN", makes it possible to input the geographical elements constituting the skeleton of the route to be followed, such as the points imposed by the departure and arrival procedures, the waypoints, and the airways (or "air corridors"). A navigation database 105, named "NAV DB", contains data relating to the waypoints, to the beacons, and to the portions of trajectories, also called "legs". It makes it possible to construct geographical routes and flight procedures. A performance database 106, named "PERF DB", contains information relating to the aerodynamic parameters and to the performance of the aircraft's engines. A lateral trajectory determination module 107, named "TRAJ", makes it possible to construct a continuous trajectory on the basis of the points of the flight plan, complying with the aircraft's performance and the confinement constraints. A prediction module 108, named "PRED", makes it possible to construct an optimized vertical profile on the lateral trajectory. A guidance module 109, named "GUIDANCE", makes it possible to guide the aircraft in the vertical plane and the lateral plane on its three-dimensional trajectory, while optimizing its speed. This module 109 is connected to the automatic pilot 110. Finally, digital link means 111, named "DATALINK", allow communication with control centers and other aircraft 112.

The present invention proposes to determine a lateral approach trajectory making it possible to reabsorb the surplus energy for landing. It applies equally well in the case of laterally and vertically guided approaches such as instrument approaches (ILS), microwave landing system (MLS) approaches, GPS landing system (GLS) approaches, radio beacon beam and vertical navigation (LOC/VNAV) approaches, and FMS-emulated virtual beam (FLS) approaches, and in the case of laterally-only guided approaches, for example approaches of VOR/DME type. Furthermore, it is not necessary for the aircraft to be situated on a lateral approach trajectory defined by a flight plan. Typically, the aircraft can follow the directives of the air traffic control in terms of heading, speed and altitude instead of following its nominated flight plan. In this case the aircraft is said to be "vectored".

Figure 2:
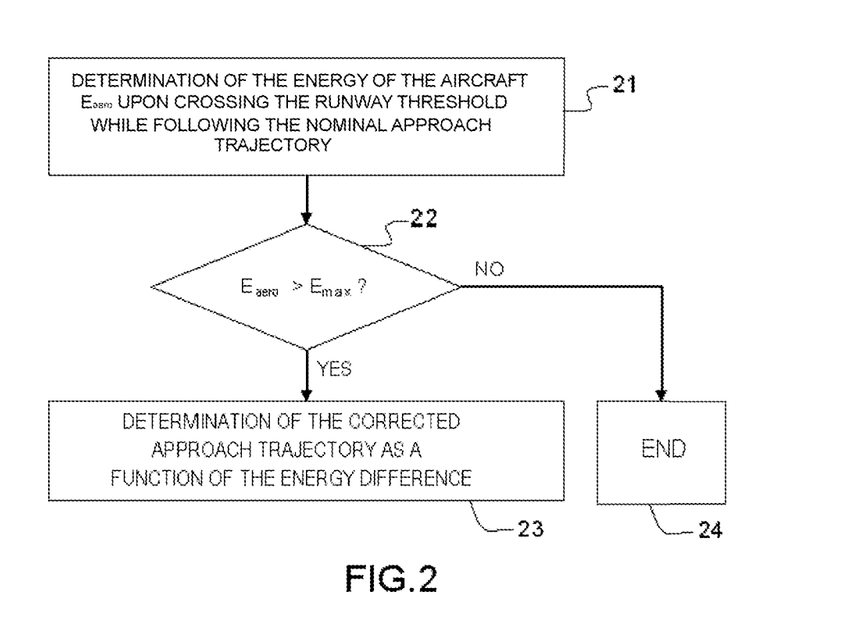
FIG. 2 represents an example of steps of the method according to the invention.

FIG. 2 represents an example of steps of the method according to the invention. In a first step 21, an energy of the aircraft $E_{aero}$ when it will cross the runway threshold is determined. This energy $E_{aero}$ is determined on the basis of a current state of the aircraft and by considering a nominal approach trajectory. The state of the aircraft at a given instant comprises at the minimum its altitude, its ground speed and its mass at this instant. The state of the aircraft can of course comprise a larger number of parameters such as its air speed and its vertical speed. The nominal approach trajectory is for example the trajectory determined by the modules 107 and 108 of the FMS as a function of the flight plan. It is a three-dimensional trajectory (3D). In the case where the aircraft is not flying on an approach trajectory imposed by the flight plan, the trajectory taken into consideration is a trajectory determined on the basis of the current position of the aircraft and linking up with the landing runway final approach trajectory. The energy $E_{aero}$ is that which the aircraft is assumed to have at the moment at which it crosses the runway threshold if it follows the nominal approach trajectory. In practice, it can therefore be determined on the basis of the estimated state of the aircraft at the moment at which it crosses the runway threshold. The energy $E_{aero}$ consists for example of the sum of the horizontal kinetic energy $E_c$ and of the potential energy $E_p$ at the moment of crossing the runway threshold, as indicated by the following relation:

$$E_{a\acute{e}ro} = E_c + E_p$$
$$= \frac{1}{2} m \cdot V^2 + m \cdot g \cdot H,$$

where m is the predicted mass of the aircraft, V is its predicted ground speed, g is the gravitational constant, and H the predicted altitude of the aircraft with respect to the landing runway. The expression "predicted" is intended to mean the value arising from the "forward" calculation for these parameters. The mass m can be the aircraft's mass determined by prediction at the moment of crossing the runway threshold. For the sake of simplification, it can also be the mass of the aircraft at the moment of the calculation of the energy $E_{aero}$. The gravitational constant is preferably that at the level of the landing runway, but it can nonetheless be approximated. In a second step 22, the energy $E_{aero}$ is compared with a maximum energy $E_{max}$. This energy $E_{max}$ is predetermined as a function of the aircraft. It can also depend on the length of the runway and the wind conditions. According to a particular embodiment, the energy $E_{max}$ is calculated on the basis of a permissible maximum ground speed $V_{max}$ and of a permissible maximum altitude $H_{max}$, as indicated by the following relation:

$$E_{max} = \frac{1}{2} m \cdot V_{max}^2 + m \cdot g \cdot H_{max}.$$

If it is determined during step 22 that the energy $E_{aero}$ is greater than the energy $E_{max}$, this signifies that the nominal approach trajectory is incompatible with the current state of the aircraft and its performance. Thus, in a third step 23, the approach trajectory is modified as a function of the energy to be reabsorbed, that is to say the difference between the maximum energy $E_{max}$ and the energy of the aircraft $E_{aero}$ estimated upon crossing the runway threshold while following the nominal approach trajectory. More generally, step 23 consists in determining a new approach trajectory for the aircraft, called a corrected approach trajectory, this trajectory having to allow the aircraft to cross the runway threshold with a lower energy $E_{aero}$ than the maximum energy $E_{max}$. Of course, there is no unique approach trajectory making it possible to cross the runway threshold with a lower energy than the maximum energy $E_{max}$. If it is determined during step 22 that the energy $E_{aero}$ is lower than the energy $E_{max}$, the nominal approach trajectory does not need to be modified. The method for determining a corrected lateral trajectory is therefore terminated in a step 24.

Figure 3:
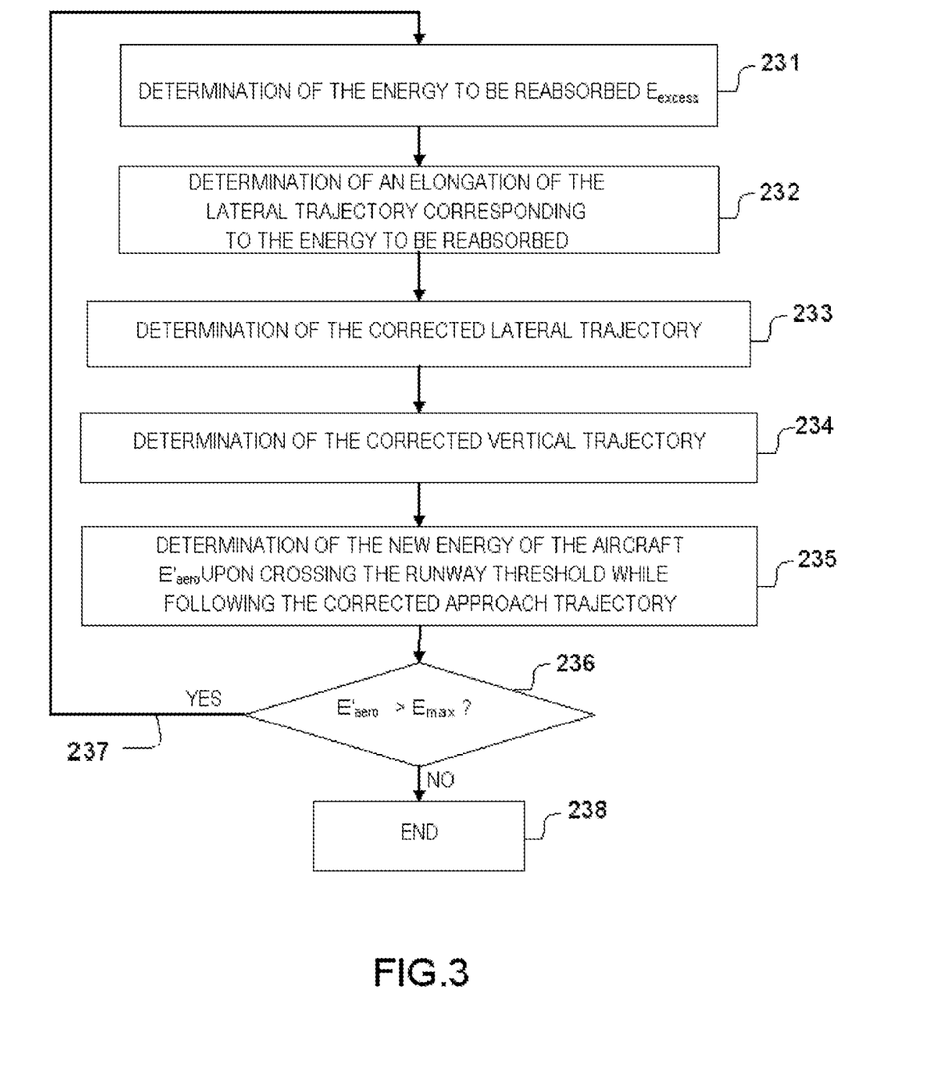
FIG. 3 represents an exemplary embodiment of a step of determining a corrected approach trajectory.

FIG. 3 represents an exemplary embodiment of step 23 of determining the corrected approach trajectory. In a first sub-step 231, the excess energy $E_{excess}$ is determined according to the following relation:

$$E_{recess} = E_{aero} - E_{max}.$$

The energy $E_{excess}$ can advantageously be bounded above so as to take into account randomness in the calculation and in the following of the corrected approach trajectory. In particular, it can be bounded above so as to compensate for the duration necessary to change heading. In a second sub-step 232, an elongation of the lateral trajectory making it possible to reabsorb this energy is determined, that is to say a trajectory length $D_{corr}$ making it possible to reabsorb the energy $E_{excess}$. By way of example, the variations in ground speed and in altitude of the aircraft that may be obtained over an integration interval "dx" as a function of the performance of the aircraft are considered. The integration interval dx preferably corresponds to a relatively small length. The corresponding ground speed $V_{dx}$ and altitude $H_{dx}$ are then determined and the energy variation dE is deduced therefrom, as indicated by the following relation:

$$\frac{dE}{dx} = \left[\frac{1}{2}m(V_{curr}^2 - V_{dx}^2) + m \cdot g(H_{curr} - H_{dx})\right] \bigg/ dx,$$

where $V_{curr}$ and $H_{curr}$ designate respectively the current ground speed and the current altitude of the aircraft with respect to the runway. The length $D_{corr}$ can thus be determined by the relation:

$$D_{corr} = \frac{E_{excess}}{\frac{dE}{dx}}.$$

The sub-step 232 can also be carried out on the basis of the equations of dynamics applied to the aircraft. The following equation is for example considered:

$$m \cdot \frac{dV}{dt} = F_{drag} + F_{thrust} + F_{lift} + P,$$

where V designates the speed of the aircraft, and where the forces applied to the aircraft are the drag force $F_{drag}$, the thrust force $F_{thrust}$, the lift force $F_{lift}$ and the weight P. The drag, thrust and lift coefficients can be given by charts taking account of the performance of the aircraft and of its state. In a third sub-step 233, a corrected lateral trajectory is determined as a function of the length $D_{corr}$. The length of the corrected lateral trajectory must be at least equal to the sum of the length of the nominal lateral trajectory and of the length $D_{corr}$. The form of the lateral trajectory can depend on several factors, as is explained hereinafter. In a fourth sub-step 234, a corrected vertical trajectory is determined as a function of the corrected lateral trajectory and of the performance of the aircraft. Insofar as the ground speed and altitude variations considered over the integration interval dx may differ along the approach trajectory, notably on account of the variation in the vertical speed and the execution of turns, it is preferable to verify that all the energy $E_{excess}$ will indeed be reabsorbed by following the corrected three-dimensional trajectory. If such is not the case, sub-steps 231 to 234 can be repeated. For this purpose, step 23 can comprise a fifth sub-step 235 on completion of sub-step 234, in which a new energy of the aircraft $E'_{aero}$ at the runway threshold is determined by considering the corrected three-dimensional trajectory. In a sixth sub-step 236, this energy $E'_{aero}$ is compared with the maximum energy $E_{max}$. If the energy $E'_{aero}$ is greater than the energy $E_{max}$, sub-steps 231 to 236 are repeated, as indicated by the return loop 237. Conversely, if the energy $E'_{aero}$ is less than the energy $E_{max}$, step 23 is terminated in a sub-step 238.

Figure 4:
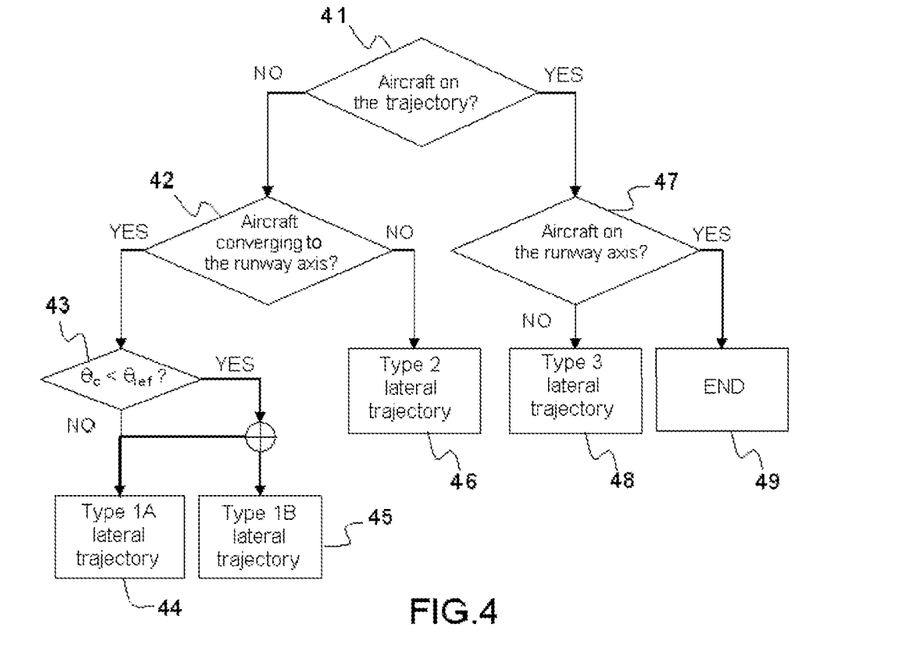
FIG. 4 represents in the form of a logic diagram an example of steps that can be carried out in a sub-step of determining a corrected lateral trajectory.

The form of the lateral trajectory determined during sub-step 233 can depend notably on the fact that the aircraft is or is not situated on the lateral trajectory imposed by the flight plan. Indeed, when the aircraft follows this trajectory, the latitude for modifying the lateral trajectory is much less significant than in the case where the aircraft is flying off-trajectory, for example when the approach is controlled from the ground. When the aircraft is flying off its trajectory, the modification of the lateral trajectory can also depend on the fact that the aircraft does or does not converge toward the axis of the runway. FIG. 4 represents in the form of a logic diagram an example of steps that can be carried out in the sub-step 233 of determining a corrected lateral trajectory so as to take into account the conditions in which the aircraft is flying. In a first step 41, it is determined whether the aircraft is flying on the lateral trajectory imposed by the flight plan. If such is not the case, in a step 42 it is determined whether the current heading of the aircraft converges toward the axis of the landing runway, that is to say whether the aircraft is approaching same. If the heading of the aircraft converges toward the axis of the runway, in a step 43 it is determined whether the angle $\theta_c$ formed between the axis of the landing runway and the current heading of the aircraft is less than a reference angle $\theta_{ref}$. Advantageously, the angle $\theta_{ref}$ is equal to 90°. If the angle $\theta_c$ is less than the angle $\theta_{ref}$, the corrected lateral trajectory is determined during sub-step 233 so as to form either a corrected lateral trajectory of type 1A, as indicated by step 44, or a corrected lateral trajectory of type 1B, as represented by step 45. These two types of trajectories are described hereinafter with reference to FIGS. 5 to 7. If the angle $\theta_c$ is greater than the angle $\theta_{ref}$, the corrected lateral trajectory is determined so as to form a corrected lateral trajectory of type 1A. If, during step 42, it is determined that the heading of the aircraft does not converge toward the axis of the runway, the corrected lateral trajectory is determined so as to form a corrected lateral trajectory of type 2, as indicated by step 46. This type of trajectory is described hereinafter with reference to FIGS. 8 and 9. If, during step 41, it is determined that the aircraft is flying on the lateral trajectory imposed by the flight plan, in a step 47 it is determined whether the aircraft is situated on the axis of the runway, that is to say if it is aligned with a view to landing. If such is not the case, the corrected lateral trajectory is determined so as to form a lateral trajectory of type 3, as indicated by step 48 described hereinafter with reference to FIG. 10. On the other hand, if the aircraft is already aligned with the runway, it is no longer possible to modify the lateral trajectory of the aircraft. A go-around must for example be performed. The method is then terminated in a step 49.

Figure 5:
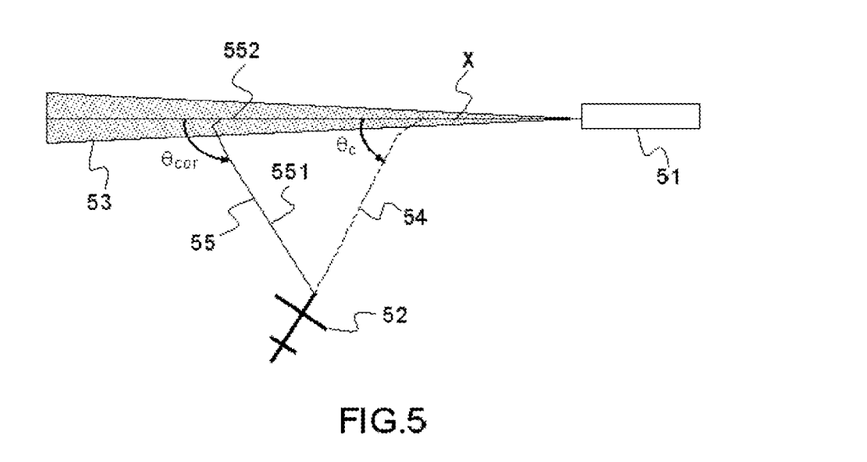
FIG. 5 represents, in a view from above, a first exemplary lateral trajectory corrected according to a first type.

FIG. 5 represents, in a view from above, a first exemplary corrected lateral trajectory of type 1A. The angle $\theta_c$ formed between the axis X of the landing runway 51 and the current heading of the aircraft 52 is less than 90°. Stated otherwise, the aircraft 52 is approaching not only the axis of the runway, but also the runway itself. In FIG. 5 is represented in the form of a triangle a radio beacon beam 53, better known as a "localizer beam". A nominal lateral approach trajectory 54 is represented dashed and the exemplary corrected lateral trajectory 55 is represented by a continuous line. The corrected lateral trajectory 55 comprises a first part, termed the linkup trajectory 551, connecting the aircraft 52 to the axis of the runway 51 and a second part, termed the final approach trajectory 552, along the axis of the runway 51. The linkup trajectory 551 is formed by a set of segments. A corrected lateral trajectory of type 1A is a lateral trajectory in which the angle $\theta_{cor}$ formed between the axis X of the runway 51 and the mean heading of the linkup trajectory 551 is increased with respect to the angle $\theta_c$ formed between the axis X of the landing runway 51 and the current heading of the aircraft 52. Stated otherwise, a corrected lateral trajectory of type 1A is a lateral trajectory comprising a linkup trajectory 551 making it possible to link up with the axis X of the runway 51 at a distance from the runway threshold that is greater than the distance between the runway threshold and a point of intersection between the current heading of the aircraft 52 and the axis X of the runway 51.

Figure 6:
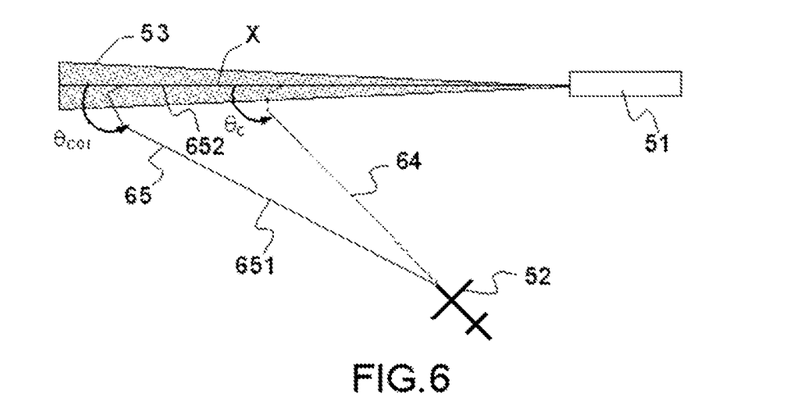
FIG. 6 represents, in a view from above, a second exemplary lateral trajectory corrected according to the first type.

FIG. 6 represents, in a view analogous to that of FIG. 5, a second exemplary corrected lateral trajectory of type 1A. A nominal lateral approach trajectory 64 is represented dashed and the exemplary corrected lateral trajectory 65 is represented by a continuous line. The corrected lateral trajectory 65 comprises a linkup trajectory 651 and a final approach trajectory 652. In FIG. 6, the angle $\theta_c$ formed between the axis X of the landing runway 51 and the current heading of the aircraft 52 is greater than 90°. Stated otherwise, the aircraft 52 is approaching solely the axis X of the runway 51, but not the runway itself. However, the angle $\theta_{cor}$ formed between the axis X of the runway 51 and the mean heading of the linkup trajectory 651 is also increased with respect to the angle $\theta_c$ formed between the axis of the landing runway and the current heading of the aircraft.

Figure 7:
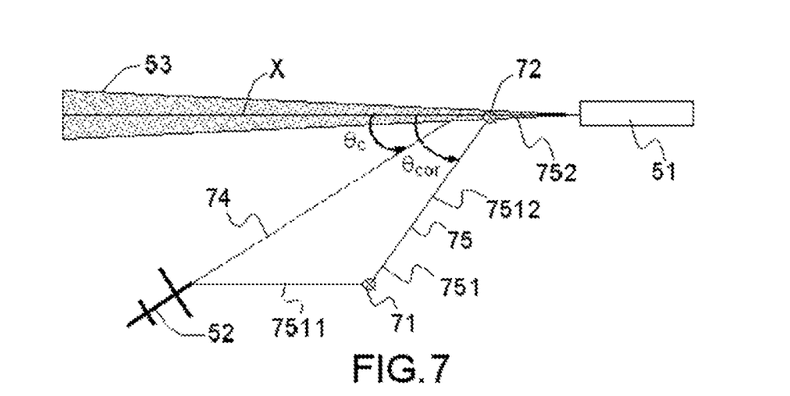
FIG. 7 represents, in a view from above, an exemplary lateral trajectory corrected according to a second type.

FIG. 7 represents, in a view analogous to that of FIGS. 5 and 6, an exemplary corrected lateral trajectory of type 1B. A nominal lateral approach trajectory 74 is represented dashed and the exemplary corrected lateral trajectory 75 is represented by a continuous line. The corrected lateral trajectory 75 comprises a linkup trajectory 751 and a final approach trajectory 752. The linkup trajectory 751 is composed of two segments forming a bayonet. The first segment 7511, lying between the aircraft 52 and a first waypoint 71, is a straight segment substantially parallel to the axis X of the runway 51. The second segment 7512, lying between the first waypoint 71 and a second waypoint 72, situated on the axis of the runway 51, is a straight segment forming an angle $\theta_{cor}$ with the axis X of the runway 51. This angle $\theta_{cor}$ is naturally greater than the angle $\theta_c$ formed between the axis of the landing runway and the current heading of the aircraft.

Figure 8:
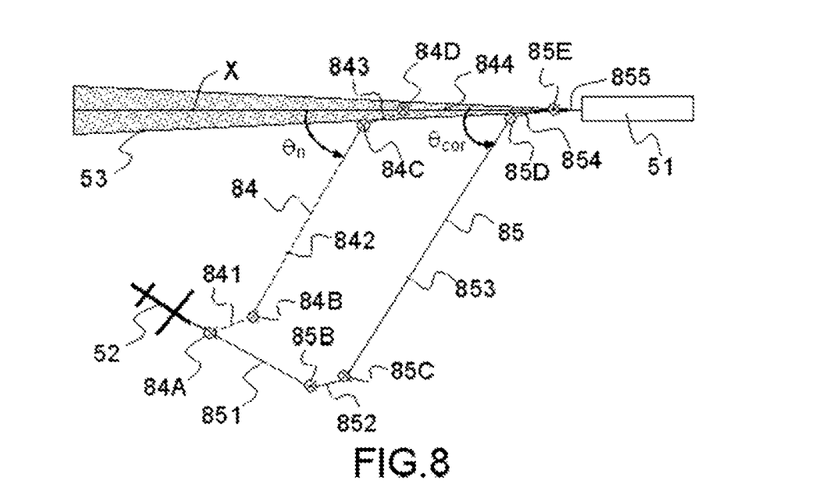
FIG. 8 represents, in a view from above, a first exemplary lateral trajectory corrected according to a third type.

FIG. 8 represents, in a view analogous to that of FIGS. 5 to 7, a first exemplary corrected lateral trajectory of type 2. A nominal lateral approach trajectory 84 is represented dashed and the exemplary corrected lateral trajectory 85 is represented by a continuous line. The nominal lateral approach trajectory 84 comprises a curved segment 841 between waypoints 84A and 84B, a straight segment 842 between the waypoint 84B and a waypoint 84C, a curved segment 843 between the waypoint 84C and a waypoint 84D, and a straight segment 844 between the waypoint 84D and the threshold of the landing runway 51. The segment 842 forms an angle $\theta_n$ with the axis X of the landing runway 51. Typically, this angle $\theta_n$ is equal to 45°. The corrected lateral trajectory 85 comprises a straight segment 851 between the waypoint 84A and a waypoint 85B, a curved segment 852 between the waypoint 85B and a waypoint 85C, a straight segment 853 between the waypoint 85C and a waypoint 85D, a curved segment 854 between the waypoint 85D and a waypoint 85E, and a straight segment 855 between the waypoint 85E and the threshold of the landing runway 51. The straight segment 851 substantially follows the current heading of the aircraft 52. The segment 853 forms an angle $\theta_{cor}$ with the axis X. This angle $\theta_{cor}$ is for example equal to 45°. More generally, a lateral trajectory of type 2 comprises at the minimum a first segment (here the segment 851) allowing the aircraft 52 to continue to distance itself from the axis X of the landing runway 51, and a segment (here the segment 853) allowing the aircraft 52 thereafter to link up with the axis X of the landing runway 51.

Figure 9:
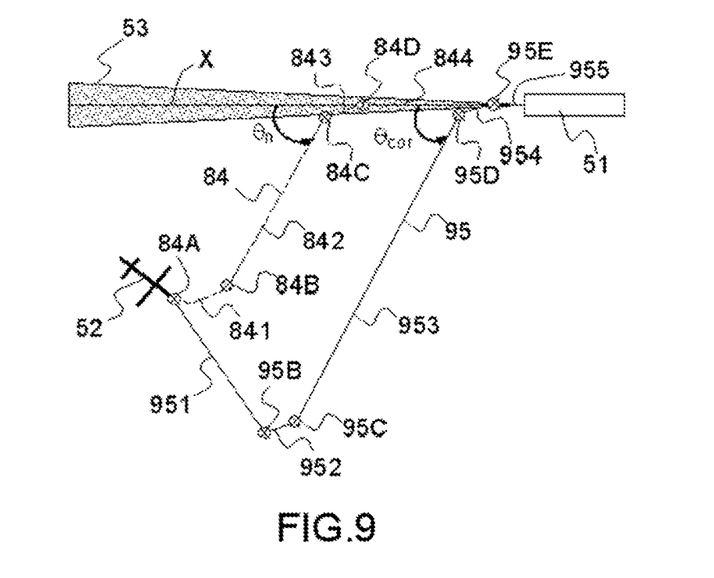
FIG. 9 represents, in a view from above, a second exemplary lateral trajectory corrected according to the third type.

When the corrected lateral trajectory of type 2 is not sufficiently elongate to reabsorb the energy $E_{excess}$ and/or when the last waypoint 85E is too near the runway threshold, the corrected lateral trajectory can cause the aircraft to distance itself a little more from the axis of the landing runway before causing it to link up with it. FIG. 9 represents, in a view analogous to that of FIGS. 5 to 8, such an exemplary corrected lateral trajectory of type 2. The nominal lateral approach trajectory 84 is identical to that of FIG. 8. On the other hand, the corrected lateral trajectory 95 differs from the corrected lateral trajectory 85. Said trajectory comprises a straight segment 951 between the waypoint 84A and a waypoint 95B, a curved segment 952 between the waypoint 95B and a waypoint 95C, a straight segment 953 between the waypoint 95C and a waypoint 95D, a curved segment 954 between the waypoint 95D and a waypoint 95E, and a straight segment 955 between the waypoint 95E and the threshold of the landing runway 51. The straight segment 953 forms an angle $\theta_{cor}$ with the axis X, for example equal to 45°. The main difference with the corrected lateral trajectory 85 of FIG. 8 is that the straight segment 951 separates the aircraft further from the axis X, that is to say the angle formed between the axis X of the runway 51 and the straight segment 951 is less than the angle formed between the axis X and the current heading of the aircraft 52.

Figure 10:
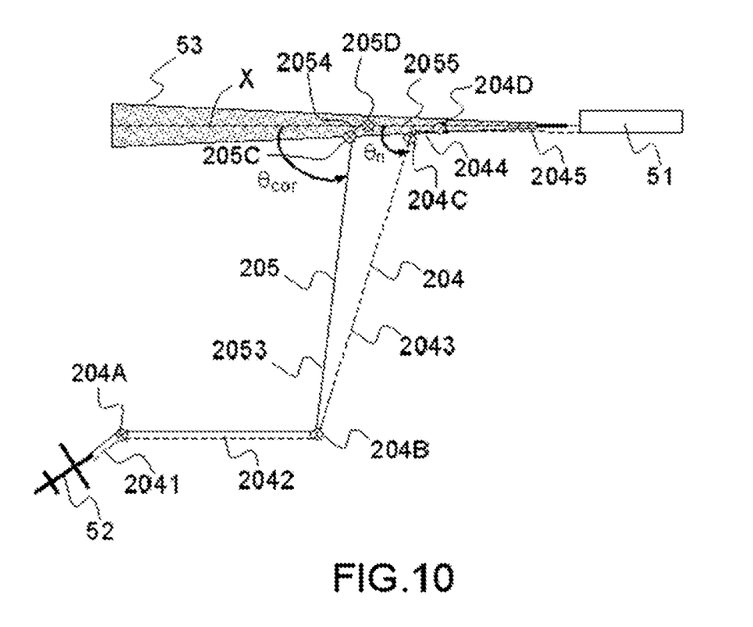
FIG. 10 represents, in a view from above, an exemplary lateral trajectory corrected according to a fourth type.

A corrected lateral trajectory of type 3 can be likened either to a corrected lateral trajectory of type 1A, or to a corrected lateral trajectory of type 1B, or to a corrected lateral trajectory of type 2. The choice of the type of correction is performed as a function of the orientation of the last straight segment of the nominal approach trajectory before alignment with the axis X of the landing runway. Thus, the type of trajectory no longer depends on the current heading of the aircraft, but on the orientation of the last straight segment before alignment. FIG. 10 represents, in a view analogous to that of FIGS. 5 to 9, an exemplary corrected lateral trajectory of type 3. A nominal lateral approach trajectory 204 is represented dashed and the exemplary corrected lateral trajectory 205 is represented by a continuous line. The nominal lateral approach trajectory 204 comprises a straight segment 2041 between the current position of the aircraft 52 and a waypoint 204A, a straight segment 2042 between the waypoint 204A and a waypoint 204B, a straight segment 2043 between the waypoint 204B and a waypoint 204C, a curved segment between the waypoint 204C and a waypoint 204D situated on the axis X of the runway 51, and a straight segment 2045 between the waypoint 204D and the threshold of the runway 51. Insofar as the aircraft 52 is situated on a lateral trajectory defined by a flight plan, the possibilities for modifying the lateral trajectory are limited. In this instance, the corrected lateral trajectory 205 differs solely onward of the waypoint 204B, that is to say the waypoint onward of which the last segment 2043 before alignment with the axis X of the runway 51 begins. The corrected lateral trajectory 205 comprises a straight segment 2053 between the waypoint 204B and a waypoint 205C, a curved segment 2054 between the waypoint 205C and a waypoint 205D situated on the axis X, and a straight segment 2055 between the waypoint 205D and the threshold of the runway 51. The angle $\theta_{cor}$ formed between the axis X and the segment 2053 of the corrected lateral trajectory 205 is greater than the angle $\theta_n$ formed between the axis X and the segment 2043 of the nominal lateral approach trajectory 204.

The invention claimed is:

1. A method for determining a corrected approach trajectory for the approach of an aircraft to a landing runway, comprising:
  - determining an energy of the aircraft $E_{aero}$ upon crossing the runway threshold on the basis of a predetermined approach trajectory and of a current state of the aircraft, said state comprising at least one current altitude, a current ground speed and a mass of the aircraft, and
  - comparing the energy of the aircraft $E_{aero}$ upon crossing the runway threshold with a predetermined maximum energy $E_{max}$, and
  - when the energy of the aircraft $E_{aero}$ upon crossing the runway threshold is greater than the maximum energy $E_{max}$, determining a corrected approach trajectory as a function of the difference between the energy of the aircraft $E_{aero}$ and the maximum energy $E_{max}$; and
  - wherein determining the corrected approach trajectory further comprises:
    - determining an energy to be reabsorbed $E_{excess}$ as a function of the energy of the aircraft $E_{aero}$ upon crossing the runway threshold and of the maximum energy $E_{max}$,
    - determining a trajectory length $D_{corr}$ making it possible to reabsorb the energy $E_{excess}$ as a function of performance of the aircraft,
    - determining a corrected lateral trajectory as a function of the trajectory length $D_{corr}$, and
    - determining a corrected vertical trajectory as a function of the corrected lateral trajectory and of the performance of the aircraft.

2. The method as claimed in claim 1, in which the energy of the aircraft $E_{aero}$ upon crossing the runway threshold comprises a kinetic energy and a potential energy, the kinetic energy being determined as a function of a ground speed of the aircraft upon crossing the runway threshold, and the potential energy being determined as a function of an altitude of the aircraft with respect to the runway upon crossing the runway threshold.

3. The method as claimed in claim 1, in which the maximum energy $E_{max}$ is determined as a function of a maximum ground speed and of a maximum altitude of the aircraft with respect to the runway.

4. A flight management system of an aircraft, comprising means for implementing the method as claimed in claim 1.

5. The method as claimed in claim 1, in which the determining the corrected approach trajectory comprises:
  - determining an energy $E'_{aero}$ of the aircraft upon crossing the runway threshold on the basis of the corrected lateral trajectory, of the corrected vertical trajectory, and of the current state of the aircraft,
  - comparing the energy of the aircraft $E'_{aero}$ with the maximum energy $E_{max}$,
  - when the energy of the aircraft $E'_{aero}$ is greater than the maximum energy $E_{max}$, a repetition of determining the corrected approach trajectory as a function of the difference between the energy of the aircraft $E'_{aero}$ and the maximum energy $E_{max}$.

6. The method as claimed in claim 1, in which the form of the corrected lateral trajectory is dependent on the fact that the aircraft is or is not flying according to an approach trajectory imposed by a flight plan.

7. The method as claimed in claim 1, in which the form of the corrected lateral trajectory is dependent on the fact that the heading of the aircraft does or does not converge toward the axis of the landing runway.

8. The method as claimed in claim 6 in which, when the aircraft is not flying on an approach trajectory imposed by a flight plan, when its heading converges toward the axis of the landing runway, and when an angle $\theta_c$ formed between the axis of the landing runway and the heading of the aircraft is less than a reference angle $\theta_{ref}$, the form of the corrected lateral trajectory is of type 1A or of type 1B, a corrected lateral trajectory of type 1A comprising a part making it possible to link up with the axis of the runway at a distance from the runway threshold that is greater than a distance between the runway threshold and a point of intersection between the heading of the aircraft and the axis of the landing runway, a corrected lateral trajectory of type 1B comprising a first straight segment substantially parallel to the axis of the landing runway and a second straight segment substantially linking up with the axis of the landing runway.

9. The method as claimed in claim 6 in which, when the aircraft is not flying on an approach trajectory imposed by a flight plan, when its heading converges toward the axis of the landing runway, and when an angle $\theta_c$ formed between the axis of the landing runway and the heading of the aircraft is greater than a reference angle $\theta_{ref}$, the form of the corrected lateral trajectory is of type 1A, such a trajectory comprising a part making it possible to link up with the axis of the runway at a distance from the runway threshold that is greater than a distance between the runway threshold and a point of intersection between the heading of the aircraft and the axis of the landing runway.

10. The method as claimed in claim 6 in which, when the aircraft is not flying on an approach trajectory imposed by a flight plan, and when its heading does not converge toward the axis of the landing runway, the form of the corrected lateral trajectory is of type 2, such a trajectory comprising a first segment distancing the aircraft from the axis of the landing runway and a second segment thereafter causing the aircraft to link up with the axis of the landing runway.

11. The method as claimed in claim 10, in which an angle formed between the axis of the landing runway and the first segment is less than an angle formed between the axis of the landing runway and the heading of the aircraft.

12. The method as claimed in claim 6 in which, when the aircraft is flying on an approach trajectory imposed by a flight plan, and when its heading is not aligned with the axis of the landing runway, the form of the corrected lateral trajectory is of type 3, a corrected lateral trajectory of type 3 comprising, in place of the last straight segment of the approach trajectory imposed by the flight plan:
  - a segment making it possible to link up with the axis of the runway at a distance from the runway threshold that is greater than a distance between the runway threshold and a point of intersection between the last straight segment of the approach trajectory imposed by the flight plan and the axis of the landing runway, when said last straight segment converges toward the axis of the runway and when an angle formed between said last straight segment and the axis of the landing runway is less than a reference angle,
  - a first straight segment substantially parallel to the axis of the landing runway and a second straight segment substantially linking up with the axis of the landing runway, when the last straight segment of the approach trajectory imposed by the flight plan converges toward the axis of the runway and when an angle formed between said last straight segment and the axis of the landing runway is greater than a reference angle, a first segment distancing the aircraft from the axis of the landing runway and a second segment thereafter causing the aircraft to link up with the axis of the landing runway, when the last straight segment of the approach trajectory imposed by the flight plan does not converge toward the axis of the runway.

\* \* \* \* \*